(12) United States Patent
Yang

(10) Patent No.: US 12,330,069 B2
(45) Date of Patent: Jun. 17, 2025

(54) PROP CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Jinhao Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 295 days.

(21) Appl. No.: 18/046,122

(22) Filed: Oct. 12, 2022

(65) Prior Publication Data

US 2023/0057421 A1 Feb. 23, 2023

Related U.S. Application Data

(63) Continuation of application No. PCT/CN2021/098687, filed on Jun. 7, 2021.

(51) Int. Cl.
*A63F 13/837* (2014.01)
*A63F 13/219* (2014.01)
*A63F 13/245* (2014.01)
*A63F 13/428* (2014.01)

(52) U.S. Cl.
CPC .......... *A63F 13/837* (2014.09); *A63F 13/219* (2014.09); *A63F 13/245* (2014.09); *A63F 13/428* (2014.09)

(58) Field of Classification Search
CPC .... A63F 13/837; A63F 13/219; A63F 13/245; A63F 13/428

USPC ............................................................ 463/2
See application file for complete search history.

(56) References Cited

U.S. PATENT DOCUMENTS

| | | | | |
|---|---|---|---|---|
| 9,114,318 B2 * | 8/2015 | Ikematsu | | A63F 13/426 |
| 9,561,436 B2 * | 2/2017 | Tsuchiya | | A63F 13/426 |
| 10,183,222 B2 * | 1/2019 | Tsui | | A63F 13/837 |
| 2004/0063501 A1 * | 4/2004 | Shimokawa | | A63F 13/837 |
| | | | | 463/49 |
| 2006/0199626 A1 * | 9/2006 | Ortiz | | A63F 13/5375 |
| | | | | 463/2 |

(Continued)

FOREIGN PATENT DOCUMENTS

| CN | 107661630 A | 2/2018 |
|---|---|---|
| CN | 107773987 A | 3/2018 |

(Continued)

OTHER PUBLICATIONS

Korean Office Action with English translation, dated Jun. 24, 2024 issued in Korean Patent Application No. 10-2022-7031420, 9 pages.

(Continued)

*Primary Examiner* — Allen Chan
(74) *Attorney, Agent, or Firm* — Crowell & Moring LLP

(57) ABSTRACT

Prop control includes acquiring a trigger operation performed on a target shooting prop in an activated state in a virtual battlefield scene. The attack range of the target shooting prop may cover a partial area in the virtual battlefield scene. In response to the trigger operation, a target object targeted by the target shooting prop is determined. Using the target shooting prop, a plurality of continuous shooting actions are performed during a target time period on a target area in which the target object is located.

18 Claims, 13 Drawing Sheets

(56) References Cited

U.S. PATENT DOCUMENTS

2006/0287027 A1* 12/2006 Hardisty ............... A63F 13/45
 463/8
2013/0079138 A1 3/2013 Mizuno
2014/0342788 A1 11/2014 Kim

FOREIGN PATENT DOCUMENTS

| CN | 107930115 A | 4/2018 |
|---|---|---|
| CN | 108159704 A | 6/2018 |
| CN | 110170168 A | 8/2019 |
| CN | 110448891 A | 11/2019 |
| CN | 110465087 A | 11/2019 |
| CN | 110465098 A | 11/2019 |
| CN | 110694261 A | 1/2020 |
| CN | 110721468 A | 1/2020 |
| CN | 111097170 A | 5/2020 |
| CN | 111104021 A | 5/2020 |
| CN | 111111219 A | 5/2020 |
| CN | 111359215 A | 7/2020 |
| CN | 111659118 A | 9/2020 |
| KR | 10-2013-0112586 | 10/2013 |

OTHER PUBLICATIONS

"Grenade 3 minute attribute guide" at 1:36 to 3:08 posted online: Feb. 3, 2018, URL: https://www.youtube.com/watch?v=HzZ1g3xlbvs.

"GTA Combat related 9 kinds tip" at 3:39-6:37, posted online: May 5, 2020, URL: https://www.youtube.com/watch?v=ckaJj6cVZ-g.

Office Action for China Patent Application No. 202010664321.7 posted Nov. 30, 2020 (only Chinese language) (11 pages).

International Search Report and Written Opinion received for Application No. PCT/CN2021/098687 mailed Sep. 15, 2021 (English and Chinese languages) (11 pages).

Japanese Office Action with English translation, dated Jul. 31, 2023, pp. 1-6, issued in Japanese Patent Application No. 2022-572422, Japanese Patent Office, Tokyo, Japan.

"[Knives Out] Strongest at close range! The strongest shotgun [Sk12 Saiga] is unrivaled", at 3:28 to 3:30 and 4:32 to 4:27, posted online: Jun. 22, 2019, accessed online: Jul. 28, 2023, URL: https://www.youtube.com/watch?v=0nRelasw6lE.

"MH3G one of the most broken weapons [pachinko]introduction", at 2:30-4:00, posted online: Mar. 27, 2023, URL: https://www.youtube.com/watch?v=OJ5BAw_TBzl.

Japanese-language Office Action issued in Japanese Patent Application No. 2024-001020 dated Feb. 26, 2025 with English translation (6 pages).

How to manufacture and use a peaky gymnile or a Mahcraft bow! The strongest Karyudo to the strongest and! The Building Research Institute, Jan. 12, 2018, [search on Feb. 24, 2001], [search on Feb. 2015] online],URL:https://Minecraft-beginner.com/archives/1203.html, [2025] Relaxation, How to make and use a Minecraft bow] Become the best off-hand hunter! Recommended enchantments!, Minecraft Architecture Research Institute, Jan. 12, 2018, [online], URL: https://minecraft-beginner.com/archives/1203.html, [Retrieved Feb. 25, 2025].

Introduction of mini, [Minecraft], Summary of the Demandant PVPMOD, [ Crosshair MOD ] [Slow scene], YouTube,2017 of 09 months, [Search on Feb. 11,online][video],URL:https://youtube.com/watch?v=CYgZDdqpoZU,[2025 ], [search on Feb. 25, 2015 ]Mini Daidai, [Minecraft ] Introducing the recommended PVP MOD![Crosshair MOD][Yukkuri Live Commentary], YouTube, Sep. 11, 2017, [online] [video], URL:https://youtube.com/watch?v=CYgZDdqpoZU, [Retrieved on Feb. 25, 2025] (Note) Due to legal or contractual restrictions, some or all of the non-patent literature presented may not be sent.

* cited by examiner

PROP CONTROL METHOD AND APPARATUS, STORAGE MEDIUM, AND ELECTRONIC DEVICE

RELATED APPLICATION

This application is a continuation of PCT Application No. PCT/CN2021/098687, filed Jun. 7, 2021, published as WO 2022/007569 A1, entitled "PROP CONTROL METHOD AND APPARATUS, AND STORAGE MEDIUM AND ELECTRONIC DEVICE", which claims priority to Chinese Patent Application No. 202010664321.7 entitled PROP CONTROL METHOD AND APPARATUS, AND STORAGE MEDIUM AND ELECTRONIC DEVICE, filed on Jul. 10, 2020, both of which are incorporated by reference in their entirety.

FIELD OF THE TECHNOLOGY

This application relates to the computer field, and specifically, to a prop control method and apparatus, a storage medium, and an electronic device.

BACKGROUND OF THE DISCLOSURE

In a virtual battlefield scene of a shooting type, a player usually needs to control a shooting prop to shoot a target object in the scene, so as to achieve victory in a current battle. For example, a shooting prop may include a lightweight equipment prop (such as a cutter or a pistol) and a heavyweight equipment prop (such as a bomb or a mortar).

However, for a shooting prop in a virtual battlefield scene, a shooting action can be triggered only once each time an operation is triggered. Thus, a player needs to frequently trigger the shooting action when the shooting prop is used for performing the shooting action. In addition, before the shooting prop is used each time, an operation of equipping the shooting prop may be relatively complex, and control efficiency of controlling the shooting prop to perform the shooting action is relatively low.

For the foregoing problems, no effective solution has been provided yet.

SUMMARY

An embodiment of this application provides a prop control method, including: acquiring a trigger operation performed on a target shooting prop in an activated state in a virtual battlefield scene, an attack range of the target shooting prop covering a partial area in the virtual battlefield scene; determining, in response to the trigger operation, a target object targeted by the target shooting prop; and performing, in a target time period by using the target shooting prop, a plurality of continuous shooting actions on a target area in which the target object is located.

An embodiment of this application provides a prop control apparatus, including: an acquiring unit, configured to acquire a trigger operation performed on a target shooting prop in an activated state in a virtual battlefield scene, an attack range of the target shooting prop covering a partial area in the virtual battlefield scene; a determining unit, configured to determine, in response to the trigger operation, a target object targeted by the target shooting prop; and a control unit, configured to perform, in a target time period by using the target shooting prop, a plurality of continuous shooting actions on a target area in which the target object is located.

An embodiment of this application provides a computer readable storage medium, where the computer readable storage medium stores a computer program, and the computer program is configured to perform the foregoing prop control method when running.

An embodiment of this application provides an electronic device, including a memory and a processor, where the memory stores a computer program, and the processor is configured to perform the foregoing prop control method by using the computer program.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device. In the following description, the term "a plurality of" refers to at least two.

Figure 1:
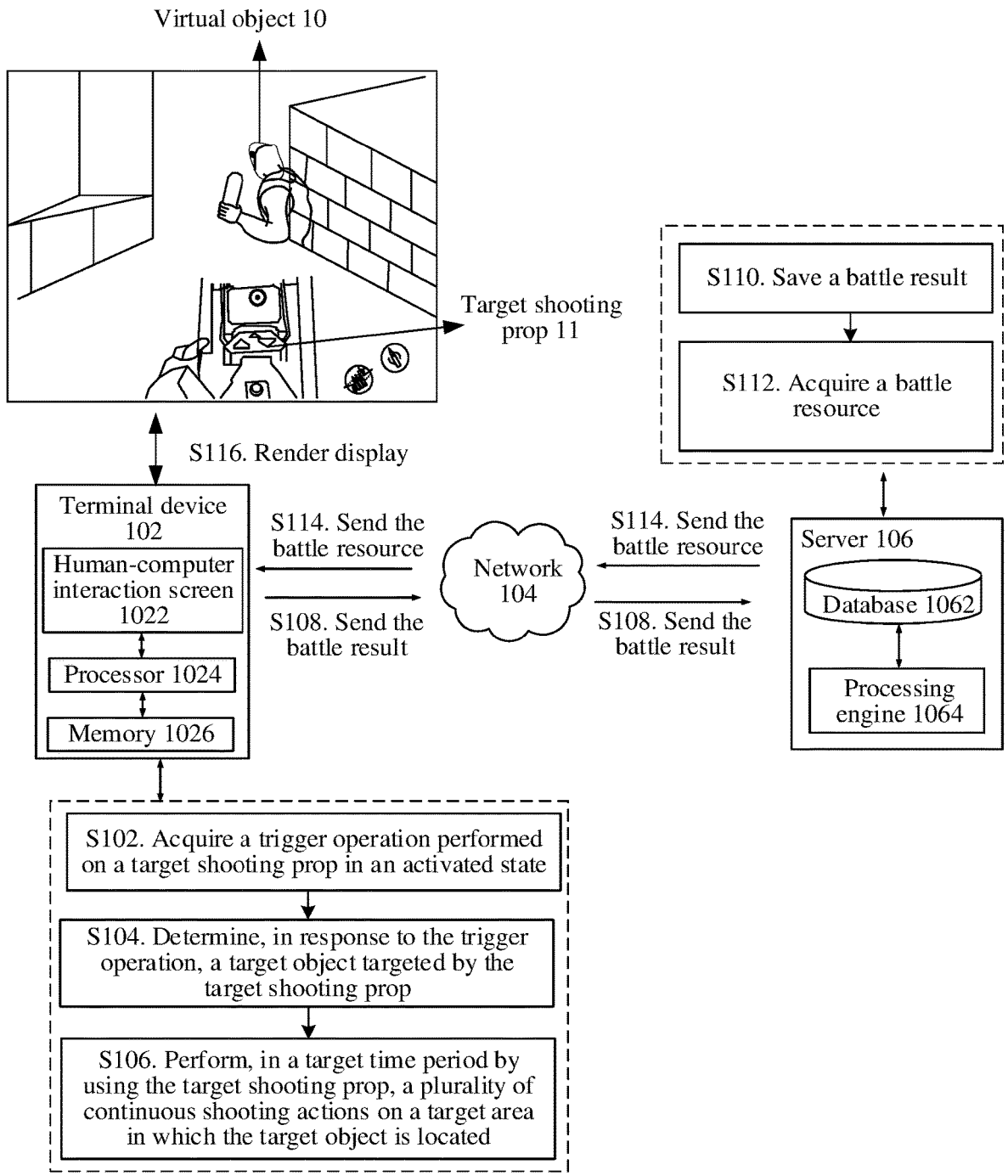
FIG. 1 is a schematic diagram of a prop control system according to an embodiment of this application.

An embodiment of this application provides a prop control method. In some embodiments, the prop control method may be applied to a prop control system in an environment shown in FIG. 1, and the prop control system may include but is not limited to a terminal device 102, a network 104, and a server 106. A shooting application client such as a shooting game application client shown in FIG. 1 runs on the terminal device 102. The terminal device 102 includes a human-computer interaction screen 1022, a processor 1024, and a memory 1026. The human-computer interaction screen 1022 is configured to present a scene picture of a virtual battlefield scene provided by a shooting task run by the foregoing shooting application client, where the shooting task is a confrontation task implemented between a plurality of virtual objects of the virtual battlefield scene. The human-computer interaction screen is further configured to provide a human-computer interaction interface to acquire a human-computer interaction operation (such as a trigger operation) performed on the human-computer interaction interface of the shooting application client. The processor 1024 is configured to: in response to the foregoing trigger operation, generate a corresponding operation instruction, and control, according to the operation instruction, a virtual object in the virtual battlefield scene to perform a corresponding shooting action. The memory 1026 is configured to store a scene picture of the virtual object in the virtual battlefield scene provided by the foregoing shooting task and attribute information of the virtual object in the virtual battlefield scene, such as an object identifier, prop information equipped by the object, and a hit point of the object.

In addition, the server 106 includes a database 1062 and a processing engine 1064. The database 1062 is configured to store a confrontation result generated by the virtual object in the shooting task, and is further configured to provide the foregoing client with a corresponding confrontation resource, such as attribute information of a prop and a picture resource of a shooting rendering effect. The processing engine 1064 is configured to: determine a current confrontation result and a confrontation resource required by the client, and send the confrontation result to the shooting application client in the terminal device 102.

An example process is as follows: As shown in steps S102-S104, in a process of a shooting task running in the terminal device 102 (a shooting battle task between a virtual object 10 shown in FIG. 1 and a virtual object holding a target shooting prop 11), as shown in step S102, a trigger operation performed on the target shooting prop in an activated state is acquired by using the human-computer interaction screen 1022, and then, as shown in steps S104-S106, a target object targeted by the target shooting prop is determined in response to the trigger operation. In addition, in a target time period, a plurality of continuous shooting actions are performed, by using the target shooting prop, on a target area in which the target object is located, where a time interval between two adjacent shooting actions may be less than a first threshold. Then, as in step S108, the confrontation result of the foregoing process is sent to the server 106 by using the network 104.

When the server 106 receives the foregoing battle result, steps S110-S114 are performed: Save the battle result, acquire a battle resource, and send the battle resource to the terminal device 102, so that the terminal device 102 renders and displays the battle result on the human-computer interaction screen 1022.

In some embodiments, the terminal device 102 may also store the battle result locally, and render and display the battle result on the human-computer interaction screen 1022 according to the locally stored battle resource. That is, the prop control method provided in this embodiment of this application may be separately implemented by the terminal device 102. For example, the terminal device 102 may run a shooting application client of an offline version (a stand-alone version).

In this embodiment, a trigger operation performed on a target shooting prop in an activated state in a virtual battlefield scene is acquired, an attack range of the target shooting prop covering a partial area in the virtual battlefield scene; in response to the trigger operation, a target object targeted by the target shooting prop is determined; and in a target time period by using the target shooting prop, a plurality of continuous shooting actions are performed on a target area in which the target object is located. In this way, an equipment operation of a target shooting prop in a game process is simplified, and a quantity of times of using the target shooting prop is increased, so as to improve control efficiency, thereby overcoming a problem in a related art that control efficiency is relatively low because a player (a user) needs to prepare for a relatively long time when using the shooting prop to perform a shooting action.

In some embodiments, the foregoing terminal device may be a terminal device configured with a shooting application client, and may include but is not limited to at least one of the following: a mobile phone (such as an Android mobile phone or an iOS mobile phone), a notebook computer, a portable android device (PAD), a palmtop computer, a mobile Internet device (MID), a desktop computer, or a smart TV. The network may include, but is not limited to, at least one of a wired network and a wireless network. The wired network includes: at least one of a local area network, a metropolitan area network, and a wide area network. The wireless network includes: at least one of Bluetooth, Wi-Fi, and other networks implementing wireless communication. The server may be a single server, a server cluster including a plurality of servers, or a cloud server. The foregoing is merely an example. This is one embodiment and other examples are possible in other embodiments.

Figure 2:
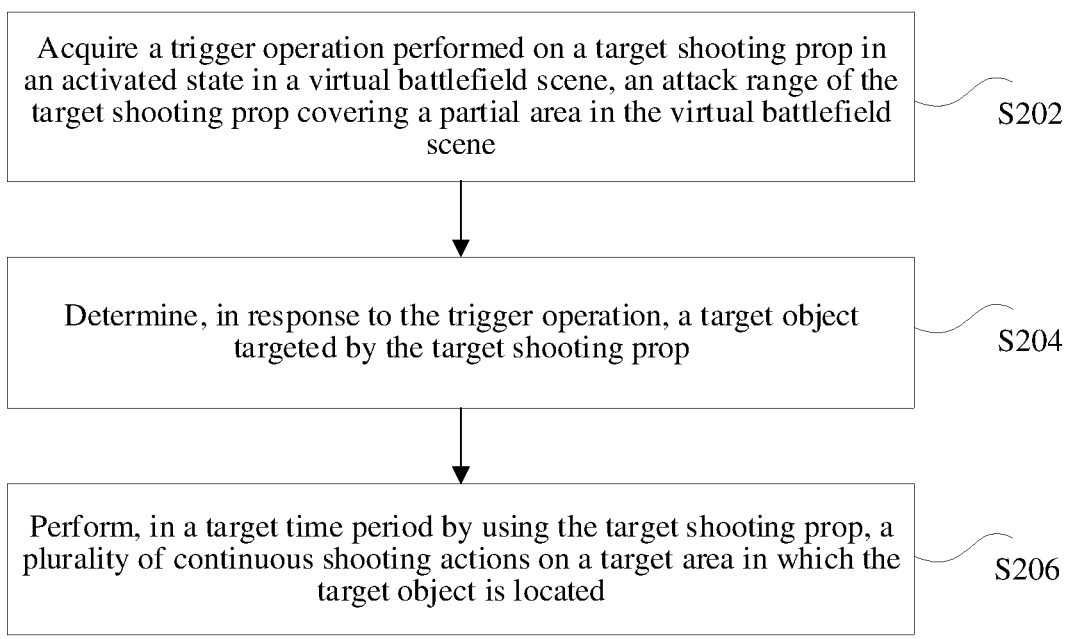
FIG. 2 is a schematic diagram of a prop control method according to an embodiment of this application.

In some embodiments, as shown in FIG. 2, the foregoing prop control method includes the following steps:

S202. Acquire a trigger operation performed on a target shooting prop in an activated state in a virtual battlefield scene, an attack range of the target shooting prop covering a partial area in the virtual battlefield scene.

S204. Determine, in response to the trigger operation, a target object targeted by the target shooting prop.

S206. Perform, in a target time period by using the target shooting prop, a plurality of continuous shooting actions on a target area in which the target object is located.

In some embodiments, the foregoing prop control method may be applied to but is not limited to a shooting application. In a process of running a shooting task of a shooting application, when a target shooting prop is configured in the shooting task, after a trigger operation performed on the target shooting prop in an activated state is acquired, a target object to be targeted is determined in response to the trigger operation, and a plurality of continuous shooting actions are performed on a target area in which the target object is located within a target time period. In this way, an equipment operation of a target shooting prop in a game process is simplified, and a quantity of times of using the target shooting prop is increased, so as to improve control efficiency, thereby overcoming a problem in a related art that control efficiency is relatively low because a player needs to prepare for a relatively long time when using the shooting prop to perform a shooting action.

In some embodiments, the foregoing shooting application may be a military simulation application (used for running a military simulation task), or may be a shooting game application, for example, may be a multiplayer online battle arena (MOBA) application, or may be a single-player game (SPG) application. The type of the shooting game application may include but is not limited to at least one of the following: a two-dimensional (2D) game application, a three-dimensional (3D) game application, a virtual reality (VR) game application, an augmented reality (AR) game application, or a mixed reality (MR) game application. The foregoing is merely an example. This is one embodiment and other examples are possible in other embodiments.

In addition, the shooting game application may be a third person shooting game (TPS) application, for example, a third-party role object perspective (that is, a third-party role perspective) other than a virtual role (virtual object) controlled by a current player, or may be a first person shooting game (FPS) application, for example, a virtual role perspective (that is, a first-person role perspective) controlled by the current player, to run the shooting game application.

A player may implement the following control by using each shooting application client: controlling a virtual role (which may also be referred to as a player role) to perform a specified action, controlling to perform an interaction action with a non-player character (NPC), controlling to perform an interaction action with a static object (such as a building or a tree) in a virtual battlefield scene, and controlling a virtual role to use a prop and a carrier equipped therefor in the virtual battlefield scene. The prop herein may include but is not limited to a heavyweight shooting prop. The heavyweight shooting prop requires a relatively complex operation and a relatively long time for equipment. However, an attack range of the heavyweight shooting prop is greater than that of a lightweight equipment prop. The foregoing is merely an example. This is one embodiment and other examples are possible in other embodiments.

In some embodiments, the foregoing trigger operation may include but is not limited to at least one of the following: human-computer interaction operations such as a touchscreen tap operation, a press operation, a touchscreen slide operation, a gesture operation, a gesture indication operation (a gesture trigger operation), a pupil locking operation, or the like. For example, a shooting task in a motion sensing game application is used as an example, and a target shooting prop may be preset according to a specified gesture operation or a specified gesture trigger operation. Then, in a task running process, when the target shooting prop is in an activated state and the player is detected, by using the camera, to display a specified gesture operation or a specified posture, it is determined that the aiming and shooting process of the target shooting prop is triggered. For another example, a shooting task in a touchscreen game application is used as an example, which may be but is not limited to setting a trigger operation of a target shooting prop according to a touchscreen key displayed on a human-computer interaction screen in advance. Then, in a task running process, when the target shooting prop is in an activated state and a touchscreen tap operation on the touchscreen key is detected, it is determined that the target shooting prop is triggered. The foregoing is merely an example. This is one embodiment and other examples are possible in other embodiments.

In a running process of a shooting task, a current virtual role controlled by a player may be equipped with but not limited to two types of shooting props: 1) a common shooting prop (a lightweight shooting prop allowed to be held); and 2) a shooting prop that needs to be loaded (a lightweight shooting prop allowed to be held and/or a heavyweight shooting prop).

A trigger prompt icon corresponding to the common shooting prop (for example, "primary weapon equipment" or "secondary weapon equipment") may be directly displayed in an operation area of the human-computer interaction interface in the process of running the shooting task, and no additional loading interface is required, so that the player can directly control the current virtual role to use the type of shooting prop to perform a shooting action. There is no need for additional prop equipment operations for the player, and there is no need for additional weapon equipment actions for the current virtual role, thus simplifying prop control operations.

However, the foregoing shooting prop that needs to be loaded is stored in a prop backpack of the current virtual role. The shooting prop needs to be added to the operation area by using an additional prop loading interface (a configuration interface). In this way, the player can control the current virtual role to use the prop to perform a shooting action. For a heavyweight shooting prop, because the prop is relatively large, each time it is equipped on the current virtual role or it is replaced, a period of time needs to be consumed for preparation. In addition, a cold time (CD) is further set for the heavyweight shooting prop herein. That is, after the shooting prop of this type is used up, the shooting prop of this type is in a frozen state within the cold time. The frozen state is used for indicating that the shooting prop does not respond when a trigger operation is detected, that is, cannot be invoked to perform a shooting action.

In this embodiment, the foregoing target shooting prop may be but is not limited to a heavyweight shooting prop (which may also be referred to as a large weapon) in the foregoing shooting prop that needs to be loaded. The target shooting prop herein may be a heavy crossbow prop, a gun prop, or the like. For example, it may be a heavyweight strong crossbow. The strong crossbow has a remote precision shooting function, and a powerful explosive is bound to an arrow of the strong crossbow. The strong crossbow further has a large-range injury function after hitting. In this way, when a trigger operation performed on the foregoing target shooting prop is acquired, a targeted target object is determined in response to the trigger operation, and continuous shooting actions in a target time period are implemented by controlling the target shooting prop, so as to improve shooting efficiency of such heavyweight shooting prop with a relatively large attack range, and obtain more efficient control and application.

In some embodiments, the foregoing target shooting prop enters a frozen state after a plurality of continuous shooting actions are completed in response to the trigger operation. The CD corresponding to the frozen state may be set to different values according to different prop attribute requirements, and this is one embodiment and other examples are possible in other embodiments. In addition, it may be but is not limited to prompting, remaining duration before exiting the frozen state by using a countdown prompt, to the player that controls the virtual role of the target shooting prop. In some embodiments, a manner of the countdown prompt may include but is not limited to one of the following: seconds countdown, progress bar countdown, or the like. This is merely an example. This is one embodiment and other examples are possible in other embodiments.

In some embodiments, determining the target object targeted by the target shooting prop may include but is not limited to: determining a size of an aim point according to operation attribute information of the trigger operation, where the size of the aim point is negatively related to a flight distance of a prop object shot by the target shooting prop when no collision. For example, the smaller the display size of the aim point is, the farther the flight distance of the prop object in the case of no collision, the more accurate the hit rate is.

That is, in this embodiment, the operation attribute information of the foregoing trigger operation may be used as a reference for adjusting the size of the aim point (also an aiming distance). The operation attribute information herein may include but is not limited to: press duration of a touchscreen press operation, pressing force (pressing pressure) of a touchscreen press operation, a slide distance of a touchscreen slide operation, holding duration of a gesture operation, holding duration of a gesture trigger operation, and the like. The operation attribute information is used as a reference condition for adjusting the aim point. For example, the longer the press duration of the touchscreen press operation is, the smaller the size of the aim point is. For another example, when the touchscreen slide operation slides in a first direction, the longer the slide distance, the smaller the size of the aim point. However, when the touchscreen slide operation slides in a second direction, the longer the slide distance, the larger the size of the aim point.

Figure 3:
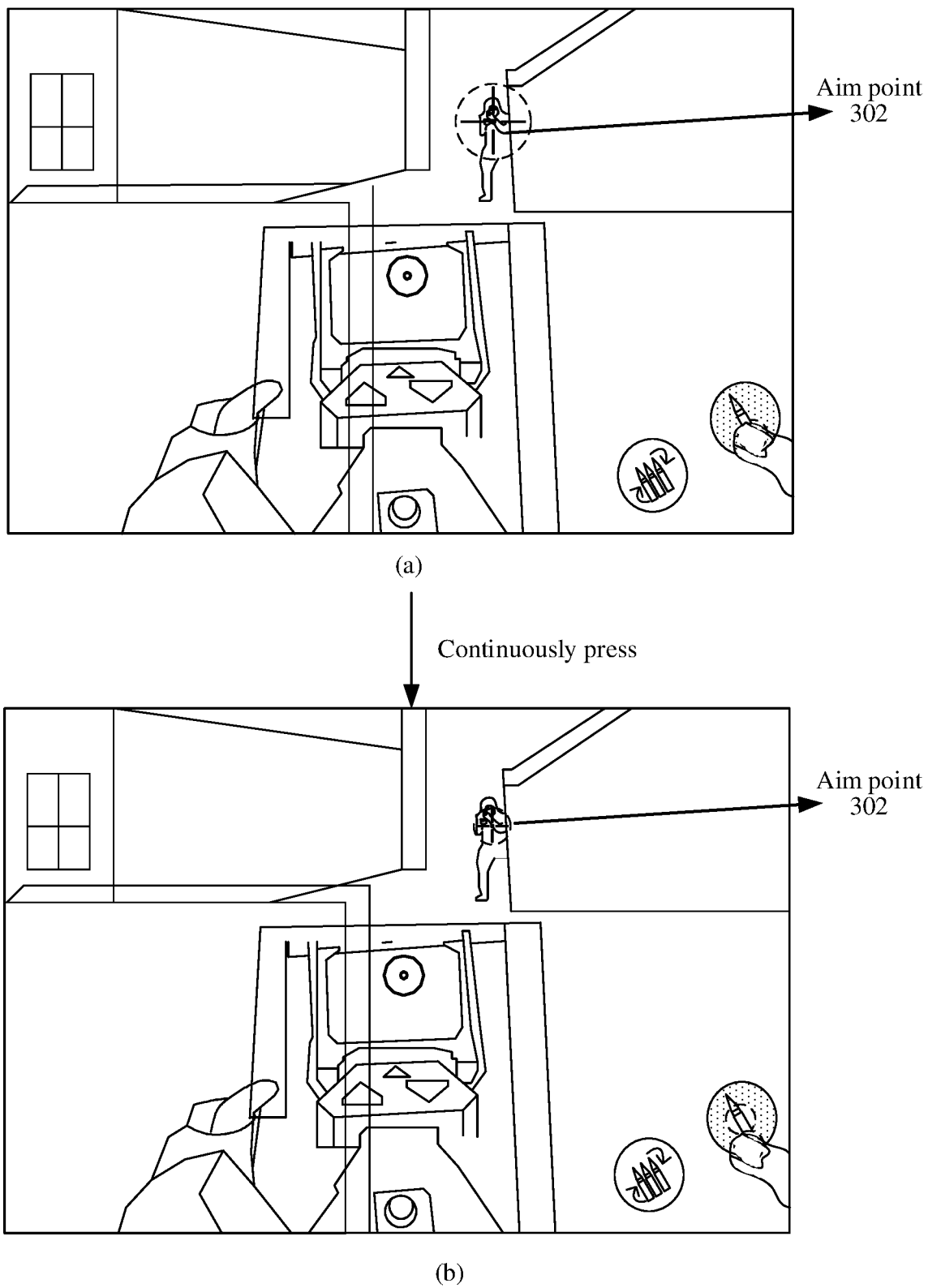
FIG. 3 is a schematic diagram of adjusting a size of an aim point according to an embodiment of this application.

For example, the press duration of the touchscreen press operation is used as an example to adjust the size of the aim point. When the touchscreen press operation is just triggered for the $0^{th}$ second, the size of the aim point of the target shooting prop 302 may be shown in (a) of FIG. 3. When the touchscreen press operation is triggered for the $2^{nd}$ second, the size of the aim point of the target shooting prop 302 may be shown in (b) of FIG. 3. That is, the longer the pressing time of the touchscreen press operation is, the longer the force storage time is, the smaller the size of the aim point of pre-aiming of the target shooting prop is. The foregoing is merely an example. This is one embodiment and other examples are possible in other embodiments.

Figure 4:
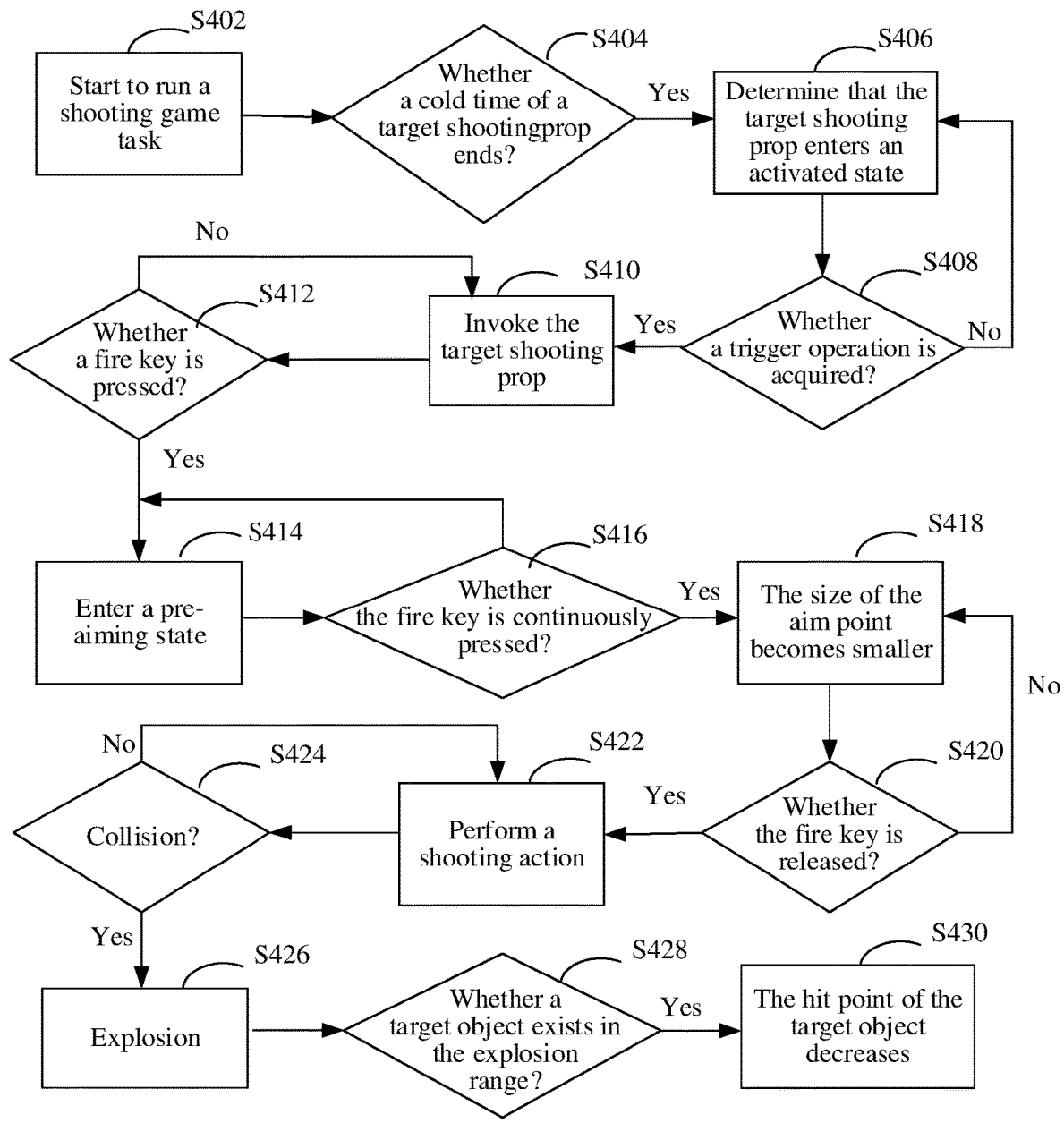
FIG. 4 is a schematic diagram of a prop control method according to an embodiment of this application.

An example in which a shooting task is a shooting game task is used for description with reference to FIG. 4. For example, in step S402, a shooting game task starts to run. Then, as in step S404, whether a cold time of a target shooting prop ends is detected. When the cold time ends, for example, step S406, it is determined that the target shooting prop enters an activated state. Next, as in step S408, it is detected whether a trigger operation on the foregoing target shooting prop is acquired. If the trigger operation is acquired, step S410 is performed; otherwise, step S406 is performed again.

When the trigger operation is acquired, steps S410-S412 are performed, that is, the target shooting prop is invoked, and it is detected whether a fire key (a shooting action trigger key) is pressed. If the fire key is pressed, step S414 is performed; otherwise, step S410 is performed again. If it is detected that the fire key is pressed, for example, in steps S414-S416, the target shooting prop is controlled to enter a pre-aiming state, and it is detected whether the fire key is continuously pressed. If it is determined that the fire key is continuously pressed, step S418 is performed, and the size of the aim point is controlled to decrease according to the press duration.

Further, as in step S420, it is detected whether the fire key is released. If the fire key is released, step S422 is performed; otherwise, step S418 is performed again. If the fire key is released, step S422 is performed, and the target shooting prop is used for performing a plurality of continuous shooting actions. Then, as in steps S424-S426, it is detected whether a prop object (such as a bullet or an arrow) shot by the target shooting prop collides with an object (a virtual object) set in a virtual object scene (a game scene). If a collision occurs, the prop object is controlled to explode. Then, steps S428-S430 are performed to detect whether there is a target object in the explosion range. If it is determined that there is a target object, the target object is controlled to be damaged, that is, a hit point of the target object decreases correspondingly.

FIG. 4 is an example, and is used for describing an implementation in an embodiment of this application. In this embodiment, a step sequence shown in FIG. 4 and a manner of performing the step sequence are not limited.

In some embodiments, determining, in response to the trigger operation, a target object targeted by the target shooting prop includes:

S1. Acquire operation attribute information of the trigger operation in response to the trigger operation.

S2. Adjust an aim point of the currently displayed target shooting prop in an aiming direction to a target size that matches the operation attribute information.

S3. Determine an object selected by the aim point as the target object.

In some embodiments, the foregoing trigger operation may be but is not limited to at least one of the following: a touchscreen operation, a gesture operation, a gesture trigger operation, or the like. The touchscreen operation may include but is not limited to at least one of the following: a press operation, a slide operation, or the like. The operation attribute information herein may be attribute information such as operation duration of a trigger operation, an operation direction of a trigger operation, and operation frequency of a trigger operation. That is, the size of the aim point may be adjusted unidirectionally. For example, the size of the aim point increases with time. In addition, the size of the aim point may be adjusted bidirectionally, for example, the adjustment direction is determined according to a slide direction or a gesture direction, and the adjustment scale is further determined according to a slide distance and a gesture movement distance. For example, slide to the left to decrease the aim point, and slide to the right to increase the aim point. This is merely an example. This is one embodiment and other examples are possible in other embodiments.

In some embodiments, the process of adjusting an aim point of the currently displayed target shooting prop in an aiming direction to a target size that matches the operation attribute information may include at least one of the following embodiments:

(1) adjusting, when the operation attribute information is operation duration, the aim point of the currently displayed target shooting prop in the aiming direction to a target size that matches the operation duration, the operation duration being negatively related to the target size, and the operation duration including any one of press duration of a press operation, gesture holding duration of a gesture operation, and holding duration of a gesture trigger operation;

(2) adjusting, when the operation attribute information is a slide distance of a slide operation, the aim point of the currently displayed target shooting prop in the aiming direction to a target size that matches the slide distance, the slide distance obtained by performing a slide operation in a first slide direction (for example, in a rightward direction) being positively related to the target size; and the slide distance obtained by performing a slide operation in a second slide direction (for example, in a leftward direction) being negatively related to the target size;

(3) adjusting, when the operation attribute information is a gesture movement distance of a gesture operation, the aim point of the currently displayed target shooting prop in the aiming direction to a target size that matches the gesture movement distance, the gesture movement distance obtained by performing a gesture operation in a first gesture direction (for example, in a rightward direction) being positively related to the target size; and the gesture movement distance obtained by performing a gesture operation in a second gesture direction (for example, in a leftward direction) being negatively related to the target size.

In this embodiment, in a process of performing the plurality of continuous shooting actions by using the target shooting prop, the player may simultaneously control, by using the shooting application client, an adjustment observation direction (that is, the aiming direction of the target shooting prop) of the current virtual role, and may further control and adjust the current virtual role to move by a specific distance. In the foregoing change process, the target object targeted by the target shooting prop is also adjusted and updated, so as to quickly and accurately shoot the updated target object.

Figure 5:
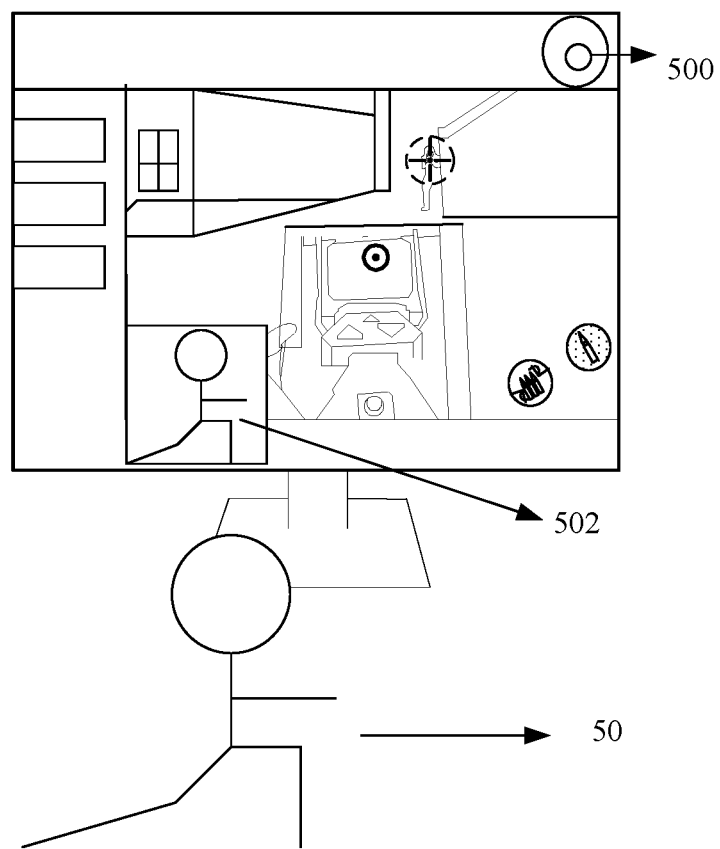
FIG. 5 is a schematic diagram of a gesture trigger operation according to an embodiment of this application.

For example, with reference to the example shown in FIG. 5, it is assumed that a player 50 is running a shooting game task by using a motion sensing shooting game application. A camera 500 collects an image of the player 50, so as to identify a current gesture action of the player 50. When the gesture action is consistent with a specified gesture action 502 prompted in the shooting game task, it is determined that a trigger operation is acquired. Further the aim point of the target shooting prop is adjusted according to detected holding duration of the foregoing posture action. For example, the longer the holding duration is, the smaller the size of the aim point of the target shooting prop is, the higher the aiming precision is, the farther the shooting distance is, and the higher the success rate of hitting the target object is.

According to the embodiment provided in this application, the aim point of the target shooting prop in the aiming direction is adjusted according to the operation attribute information of the trigger operation, so as to implement pre-aiming adjustment on the target object, thereby achieving an effect of increasing a shooting hit rate.

In some embodiments, in the process of adjusting an aim point of the currently displayed target shooting prop in an aiming direction to a target size that matches the operation attribute information, the method further includes:

S1. Acquire a shooting parameter that matches the operation attribute information, the shooting parameter including a shooting initial speed and an initial gravity acceleration of a prop object that are shot by the target shooting prop.

S2. Determine a shooting flight track of the prop object in the aiming direction according to the shooting parameter, a flight distance of the shooting flight track when no collision is negatively related to the target size of the aim point.

In some embodiments, the prop object shot by the target shooting prop may include but is not limited to an arrow shot by a crossbow, a bullet or an explosive shot by a gun, or the like. The virtual object configured in the virtual battlefield scene here simulates the physical motion in the real world, flies for a period of time according to the track of the free falling body after shooting, and collides with another reference object. A flight track obtained in the foregoing flight process is related to a shooting parameter (that is, a shooting initial speed and an initial gravity acceleration) of the foregoing prop object when the prop object is shot.

Figure 6:
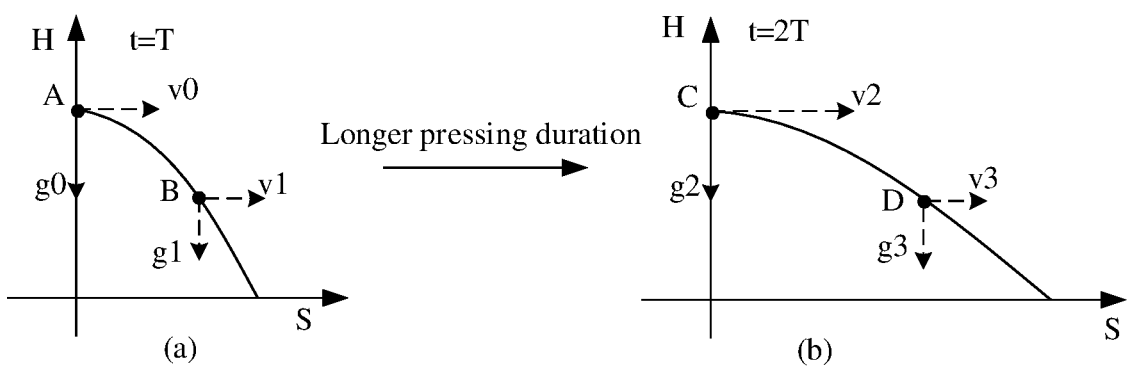
FIG. 6 is a schematic diagram of a shooting flight track according to an embodiment of this application.

For example, with reference to the example shown in FIG. 6, an example in which the press duration of the touchscreen press operation is still used for adjusting the size of the aim point is used. While the size of the aim point is adjusted, a flight track (a shooting flight track) is further determined according to a shooting parameter of a currently used target shooting prop. It is assumed that the press duration of the touchscreen press operation is T, a flight track generated by the target shooting prop when no collision (directly landing) may be shown in (a) in FIG. 6, where a shooting initial speed of an initial position A is v0, and an initial gravity acceleration is g0. The prop arrives at a position B after a period of time elapses, and the shooting speed decreases to v1 and the gravity acceleration decreases to g1. It is assumed that the press duration of the touchscreen press operation is 2T, which indicates that the pressing force storage is longer. In this case, a flight track generated by the target shooting prop when no collision (directly landing) may be shown in (b) in FIG. 6. A shooting initial speed of an initial position C is v2, and an initial gravity acceleration is g2. The prop arrives at a position D after a period of time elapses, and the shooting speed decreases to v3 and the gravity acceleration decreases to g3. Herein, because the press duration of the touchscreen press operation shown in (b) in FIG. 6 is greater than the press duration of the touchscreen press operation shown in (a) in FIG. 6, the shooting initial speed v2 shown in (b) in FIG. 6 is also greater than the shooting initial speed v0 shown in (a) in FIG. 6, and the initial gravity acceleration g2 shown in (b) in FIG. 6 is less than or equal to the initial gravity acceleration g0 shown in (a) in FIG. 6. FIG. 6 shows a reference example. This is one embodiment and other examples are possible in other embodiments.

In some embodiments, the acquiring a shooting parameter that matches the operation attribute information includes at least one of the following embodiments:

(1) acquiring, when the operation attribute information is operation duration, the shooting parameter that matches the operation duration, the operation duration being positively related to the shooting initial speed, the operation duration being negatively related to the initial gravity acceleration, and the operation duration including any one of press duration of a press operation, gesture holding duration of a gesture operation, and holding duration of a gesture trigger operation;

(2) acquiring, when the operation attribute information is a pressing pressure of a press operation, the shooting parameter that matches the pressing pressure, the pressing pressure being positively related to the shooting initial speed, and the pressing pressure being negatively related to the initial gravity acceleration;

(3) acquiring, when the operation attribute information is a slide distance of a slide operation, the shooting parameter that matches the slide distance, the slide distance obtained by performing a slide operation in a first slide direction being positively related to the shooting initial speed, and being negatively related to the initial gravity acceleration; and the slide distance obtained by performing a slide operation in a second slide direction being negatively related to the shooting initial speed, and being positively related to the initial gravity acceleration;

(4) acquiring, when the operation attribute information is a gesture movement distance of a gesture operation, the shooting parameter that matches the gesture movement distance, the gesture movement distance obtained by performing a gesture operation in a first gesture direction being positively related to the shooting initial speed, and being negatively related to the initial gravity acceleration; and the gesture movement distance obtained by performing a gesture operation in a second gesture direction being negatively related to the shooting initial speed, and being positively related to the initial gravity acceleration.

Figure 7:
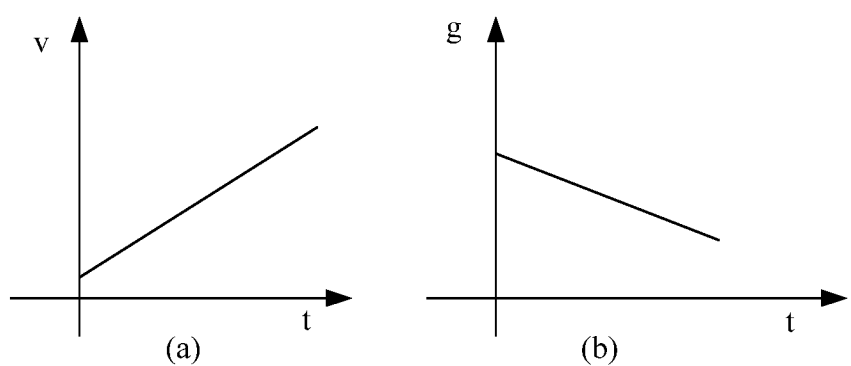
FIG. 7 is a schematic diagram of a relationship between operation duration and a shooting parameter according to an embodiment of this application.

In this embodiment, the shooting parameter may be related to but is not limited to the operation attribute information of the trigger operation. The shooting parameter may be adjusted unidirectionally. For example, as operation duration t (for example, press duration) increases, the shooting initial speed v may increase as shown in (a) in FIG. 7, and the initial gravity acceleration g may decrease as shown in (b) in FIG. 7. The figure here shows a trend, without any limitation on a specific value.

In addition, the shooting parameter may be adjusted bidirectionally, for example, the adjustment direction is determined according to a slide direction or a gesture direction, and the adjustment scale is further determined according to a slide distance and a gesture movement distance. For example, slide to the left to decrease the initial speed, and slide to the right to increase the initial speed. Herein, the initial gravity acceleration may be related to the slide distance. For example, a longer slide distance leads to a smaller initial gravity acceleration, but adjustment of the initial gravity acceleration is not unlimited, so as to ensure that a real falling track of a simulated object is a reference basis for adjustment.

According to the embodiment provided in this application, when the size of the aim point that matches the operation attribute information is acquired, the shooting operation that matches the operation attribute information may be further obtained. Therefore, a pre-aiming state of the target shooting prop is directly adjusted by using the trigger operation, so that precision of the target shooting prop is accurately adjusted in a triggering process, thereby improving accuracy when the target shooting prop is used.

In some embodiments, after the performing, by using the target shooting prop, a plurality of continuous shooting actions on a target area in which the target object is located, the method further includes:

adjusting, when the target object is located in the attack range of the target shooting prop and the prop object shot by the target shooting prop collides with the target object, hit points of all objects in the target area in which the target object is located, an adjusted hit point being less than an unadjusted hit point, and the target area being an area obtained by using the position of the target object as a center and a target distance as a radius.

Figure 8:
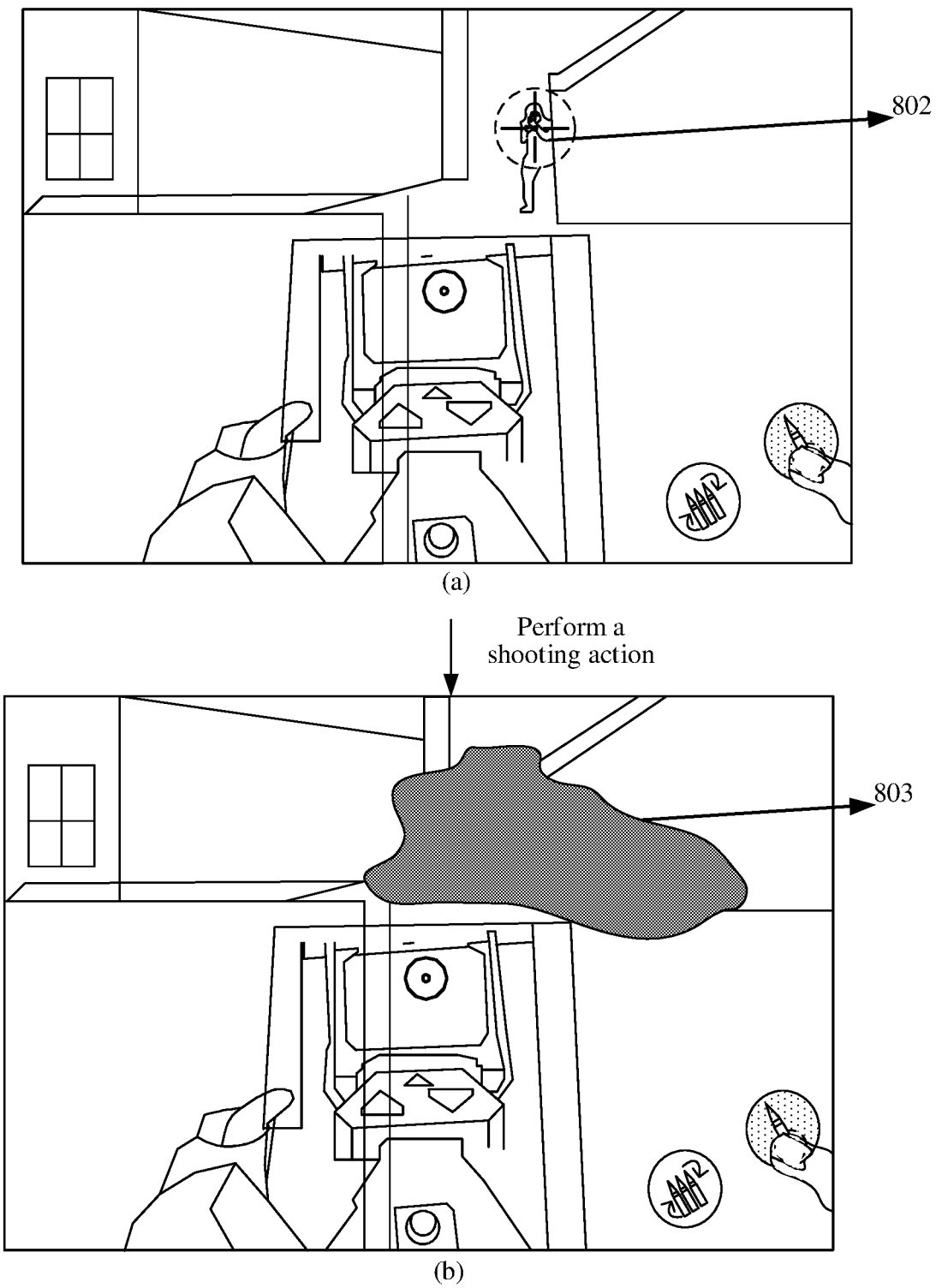
FIG. 8 is a schematic diagram of generating explosion in a target area according to an embodiment of this application.

For example, with reference to the example shown in FIG. 8, it is assumed that the target object targeted by the target shooting prop (for example, a strong crossbow) by pre-aiming adjustment is an object 802, as shown in (a) in FIG. 8. Then, a distance between the object 802 and a position of a virtual role that currently uses the target shooting prop is determined. When the distance is less than the attack range of the target shooting prop, it indicates that the prop object (such as an arrow) shot by the target shooting prop (such as a strong crossbow) may reach the position of the object 802, and collides with the object 802. Then, explosion occurs by using an explosive carried in the prop object (for example, an arrow), and a rendered explosion effect may be shown in (b) in FIG. 8. In this case, damage is caused to all objects in an area in which the object 802 is located (for example, an area 803 shown in the figure), so that a hit point of the object decreases.

According to the embodiment provided in this application, when the target object is located in the attack range of the target shooting prop, and the prop object shot by the target shooting prop collides with the target object, the target shooting prop is controlled to have a damage effect after collision, and the hit point of each of all the objects in the target area in which the target object is located is adjusted. That is, the target shooting prop provided in this embodiment is used for achieving a purpose of remotely shooting objects in the area in which the target object is located, and no complex prop equipment operation is needed, thereby improving prop control efficiency.

In some embodiments, after the performing, by using the target shooting prop, a plurality of continuous shooting actions on a target area in which the target object is located, the method further includes:

(1) adjusting, when the target object is not in the attack range of the target shooting prop and the prop object shot by the target shooting prop collides with a first reference object in the attack range of the target shooting prop, hit points of all objects in a first reference area in which the first reference object is located, an adjusted hit point being less than an unadjusted hit point, a direction of the first reference object relative to the target shooting prop being the same as a direction of the target object relative to the target shooting prop, and the first reference area being an area obtained by using the position of the first reference object as a center and a first reference distance as a radius; and (2) determining, when the target object is not located in the attack range of the target shooting prop and the prop object shot by the target shooting prop does not collide with any object in the attack range of the target shooting prop, a landing position of the prop object, determining an area in which the landing position is a center and a second reference distance is a radius as a second reference area, and adjusting hit points of all objects in the second reference area, where the adjusted hit point is less than an unadjusted hit point.

After the target shooting prop shots the prop object, the prop object is no longer controlled by the target shooting prop. If the prop collides with a newly encountered reference object in a flight track, the prop directly works within a reference area of the reference object, rather than a reference area of the target object. If the prop does not encounter the reference object in the flight track, the prop directly works within the area in which the landing position is located after landing.

In some embodiments, the foregoing first reference object may include but is not limited to: a virtual role object controlled by another player in a virtual battlefield scene (for example, a virtual battlefield scene provided by a shooting task), a non-player character (NPC) object in the virtual battlefield scene, a static object (for example, a building, a vehicle, or a tree) in the virtual battlefield scene, and the like. That is, the first reference object may be any static object or dynamic object in the virtual battlefield scene provided by the shooting task. This is one embodiment and other examples are possible in other embodiments of this application.

Figure 9:
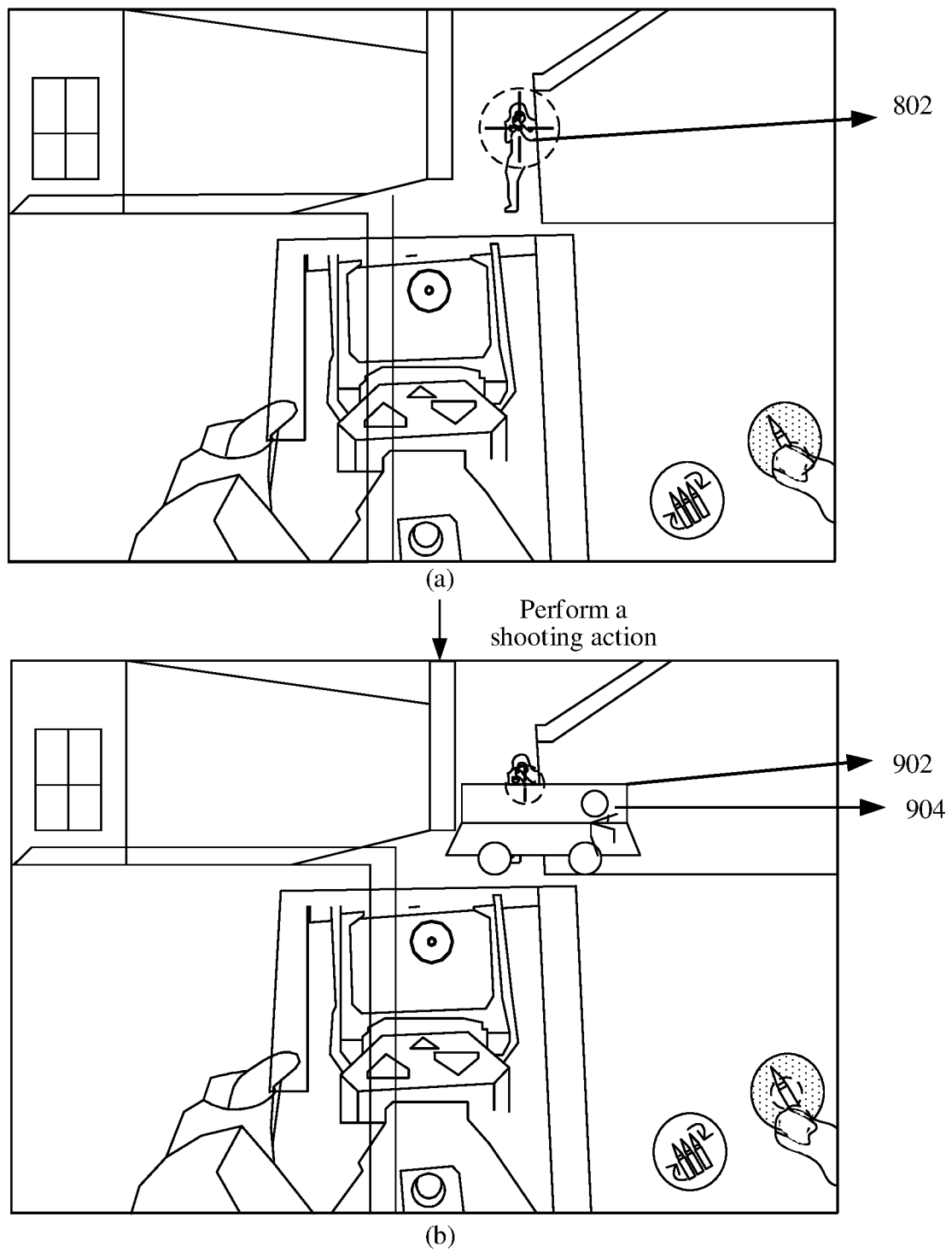
FIG. 9 is a schematic diagram of collision with a first reference object according to an embodiment of this application.

For example, with reference to the example shown in FIG. 9, it is assumed that the target object targeted by the target shooting prop (for example, a strong crossbow) by pre-aiming adjustment is an object 802, as shown in (a) in FIG. 9. Then, a distance between the object 802 and a position of a virtual role that currently uses the target shooting prop is determined. When the distance is greater than the attack range of the target shooting prop, it indicates that the prop object (such as an arrow) shot by the target shooting prop (such as a strong crossbow) cannot reach the position of the object 802.

If it is further detected that the prop object shot by the target shooting prop collides with the first reference object in the attack range of the target shooting prop (a vehicle 902 in (b) in FIG. 9), hit points of all objects in the first reference area in which the vehicle 902 is located are adjusted. As shown in (b) in FIG. 9, the first reference area includes at least an object 904, and hit point damage is caused to the object 904, that is, a hit point of the object 904 is reduced.

In addition, in this embodiment, if a distance between the object 802 and a position of a virtual role that currently uses the target shooting prop is greater than the attack range of the target shooting prop, and the prop object shot by the target shooting prop does not collide with any object, when the prop object falls to ground, hit point damage is caused to an object in an area in which a landing position is located, and a hit point of the object decreases. For a specific process, refer to the foregoing example in one embodiment.

According to the embodiment provided in this application, when the target object is not located in the attack range of the target shooting prop, whether the prop object shot by the target shooting prop collides with another reference object other than the target object or falls to ground may be detected, so as to control, according to the detection result, the target shooting prop to implement explosion, so as to affect a hit point of an object in a corresponding area.

In some embodiments, the adjusting hit points of all objects includes:
S1. Determine a distance between each of all the objects and a center; and
S2. Adjust the hit point according to the distance, the distance and a change amplitude of the hit point being negatively related.

Figure 10:
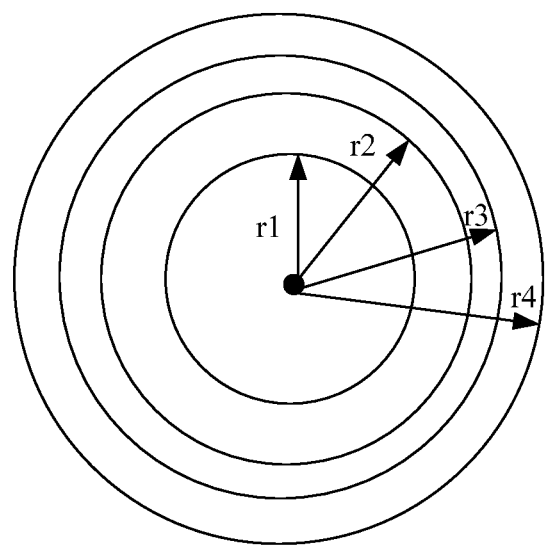
FIG. 10 is a schematic diagram of a relationship between a distance and a change amplitude of a hit point according to an embodiment of this application.

For example, with reference to FIG. 10, when explosion occurs in a corresponding area (for example, a target area, a first reference area, or a second reference area) of a prop object shot from a target shooting prop, a change amplitude of a hit point of each object is determined according to a distance between the object in a current area and a center of the area. It is assumed that, as shown in FIG. 10, the foregoing area includes four objects, and distances from the four objects to the central position are respectively $r1$, $r2$, $r3$, and $r4$. In this case, decrease amplitudes of hit points corresponding to the four objects are respectively $L1$, $L2$, $L3$, and $L4$, where $r1<r2<r3<r4$, correspondingly $L1>L2>L3>L4$, and the decrease amplitude of the hit point is proportional to the change amplitude of the distance. For example, $r1/r2=L1/L2$. This is merely an example. This is one embodiment and other examples are possible in other embodiments.

According to the embodiment provided in this application, the adjustment amplitude of the hit point corresponding to each object is determined according to the distance from the object to the center in the area, so as to make hit point damage to objects in different positions in the area, thereby achieving an objective of simulation.

In some embodiments, the performing, in a target time period by using the target shooting prop, a plurality of continuous shooting actions on a target area in which the target object is located includes:
S1. Perform, by using the target shooting prop when detecting that the aiming direction of the target shooting prop does not change in the target time period, a plurality of continuous shooting actions on the target area in which the target object is located; and
S2. Update, when detecting that the aiming direction of the target shooting prop changes within the target time period, a target object targeted before each shooting action is performed by the target shooting prop to obtain an updated target object, and perform, by using the target shooting prop, the shooting action on an updated target area in which the updated target object is located.

In this embodiment, after the target shooting prop is triggered each time, the target shooting prop performs a plurality of continuous shooting actions within the target time period without needing to perform an additional prop equipment operation before each shooting action. In this way, operation difficulty is simplified, and a shooting quantity is increased, thereby improving shooting control efficiency.

In addition, in this embodiment, if a virtual role that currently uses the target shooting prop does not turn away, the target object targeted by the target shooting prop does not change. Correspondingly, a plurality of continuous shooting actions are performed on the target area in which the target object is located. There is a time interval between a plurality of continuous shooting actions of the target shooting prop. Therefore, if the virtual role that currently uses the target shooting prop turns away during this period, the target object targeted by the corresponding plurality of continuous shooting actions of the target shooting prop also changes accordingly. Therefore, the target shooting prop whose operation is complex does not need to be re-equipped, and a remote large-range attack can be implemented on target objects in different directions, so as to increase an application range of the shooting prop, shorten shooting task duration, and improve shooting task winning probability.

Figure 11:
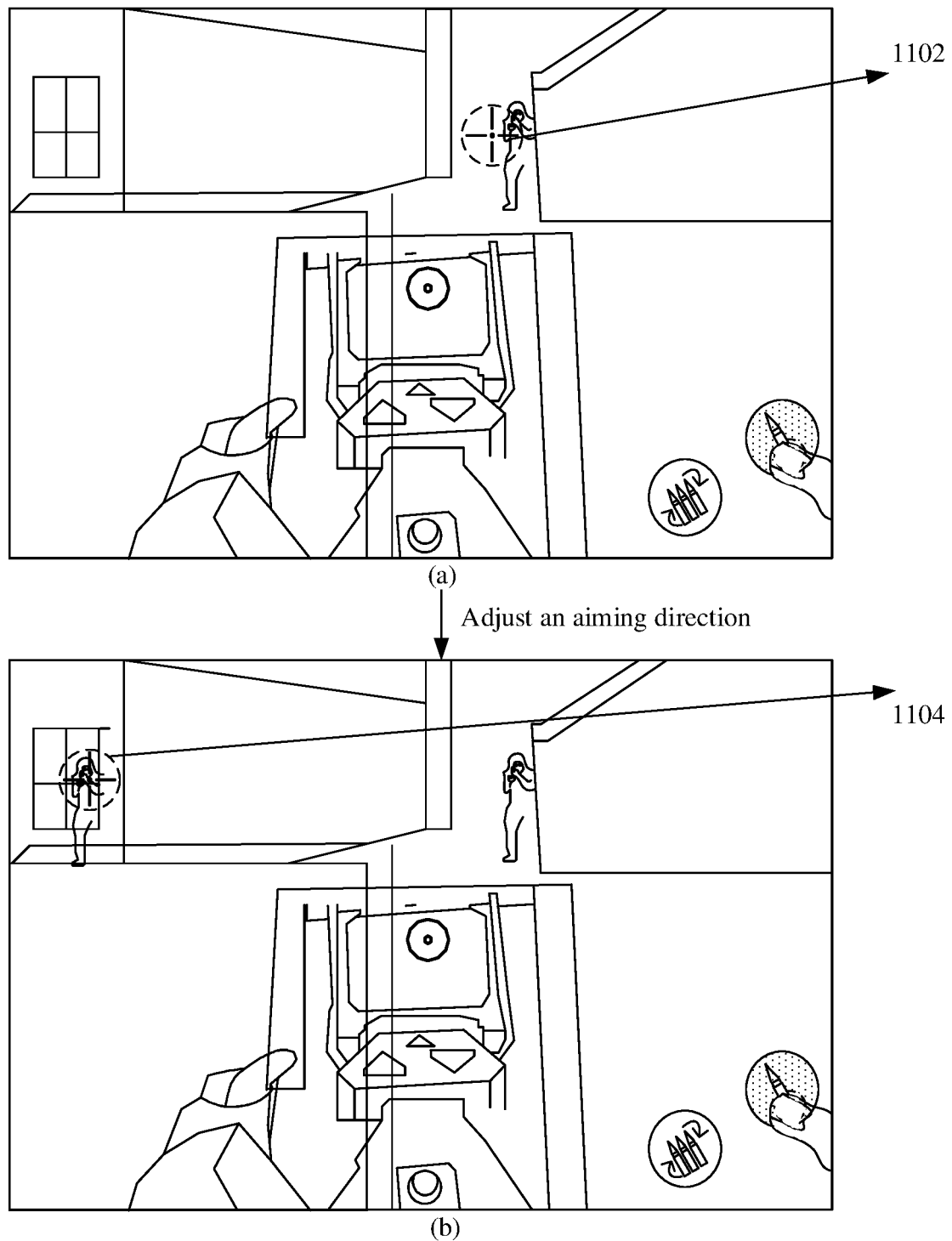
FIG. 11 is a schematic diagram of adjusting an aiming direction according to an embodiment of this application.

For example, with reference to FIG. 11, it is assumed that a target object targeted by a first shooting action of the target shooting prop is an object 1102 shown in FIG. 11 (a), a target area is determined based on the object 1102, and the target shooting prop causes damage to an object in the target area. Then, an aiming direction is adjusted when a second shooting action is performed, and the targeted target object is also correspondingly adjusted to an object 1104 shown in (b) in FIG. 11. Then, the target area is re-determined based on the object 1104, and an object in the updated target area is damaged.

According to the embodiment provided in this application, when it is detected that the aiming direction of the target shooting prop changes within the target time period, the target object targeted before each shooting action is performed by the target shooting prop is updated to obtain an updated target object and an updated target area, thereby further extending the attack range of the target shooting prop with a relatively large attack range, so as to implement large-range damage to objects in different directions.

In some embodiments, the performing, in a target time period by using the target shooting prop, a plurality of continuous shooting actions on a target area in which the target object is located includes:

S1. Perform, when detecting that the position of the target shooting prop does not change within the target time period, a plurality of continuous shooting actions on the target area in which the target object is located; and S2. Update, when detecting that the position of the target shooting prop changes within the target time period, a target object targeted before each shooting action is performed according to the position of the target shooting prop before each shooting action, and perform, by using the target shooting prop, the shooting action on an updated target area in which the updated target object is located.

If a virtual role that currently uses the target shooting prop does not move, the target object targeted by the target shooting prop does not change. Correspondingly, a plurality of continuous shooting actions are performed on the target area in which the target object is located.

In addition, there is a time interval between a plurality of continuous shooting actions of the target shooting prop. Therefore, if the virtual role that currently uses the target shooting prop moves during this period, the target object targeted by the corresponding a plurality of continuous shooting actions of the target shooting prop also changes accordingly. Therefore, the target shooting prop whose operation is complex does not need to be re-equipped, and a remote large-range attack can be implemented on different target objects in the moving process, so as to increase an application range of the shooting prop, shorten shooting task duration, and improve shooting task winning probability.

According to the embodiment provided in this application, when it is detected that the aiming direction of the target shooting prop changes within the target time period, the target object targeted before each shooting action is performed by the target shooting prop is updated to obtain an updated target object and an updated target area, thereby further extending the attack range of the target shooting prop with a relatively large attack range, so as to implement remote large-range attack on different target objects in the moving process.

In some embodiments, before the acquiring a trigger operation performed on a target shooting prop in an activated state in a virtual battlefield scene, the method further includes:

S1. Acquire a prop configuration instruction;

S2. Display, in response to the prop configuration instruction, a configuration interface that is in the shooting task and that is used for providing a shooting prop, the configuration interface including a target slot configured for the target shooting prop; and S3. Add, when a selection operation performed on the target slot is acquired, the target shooting prop to the shooting task, and display a prop trigger icon corresponding to the target shooting prop in an operation area of the shooting task.

Figure 12:
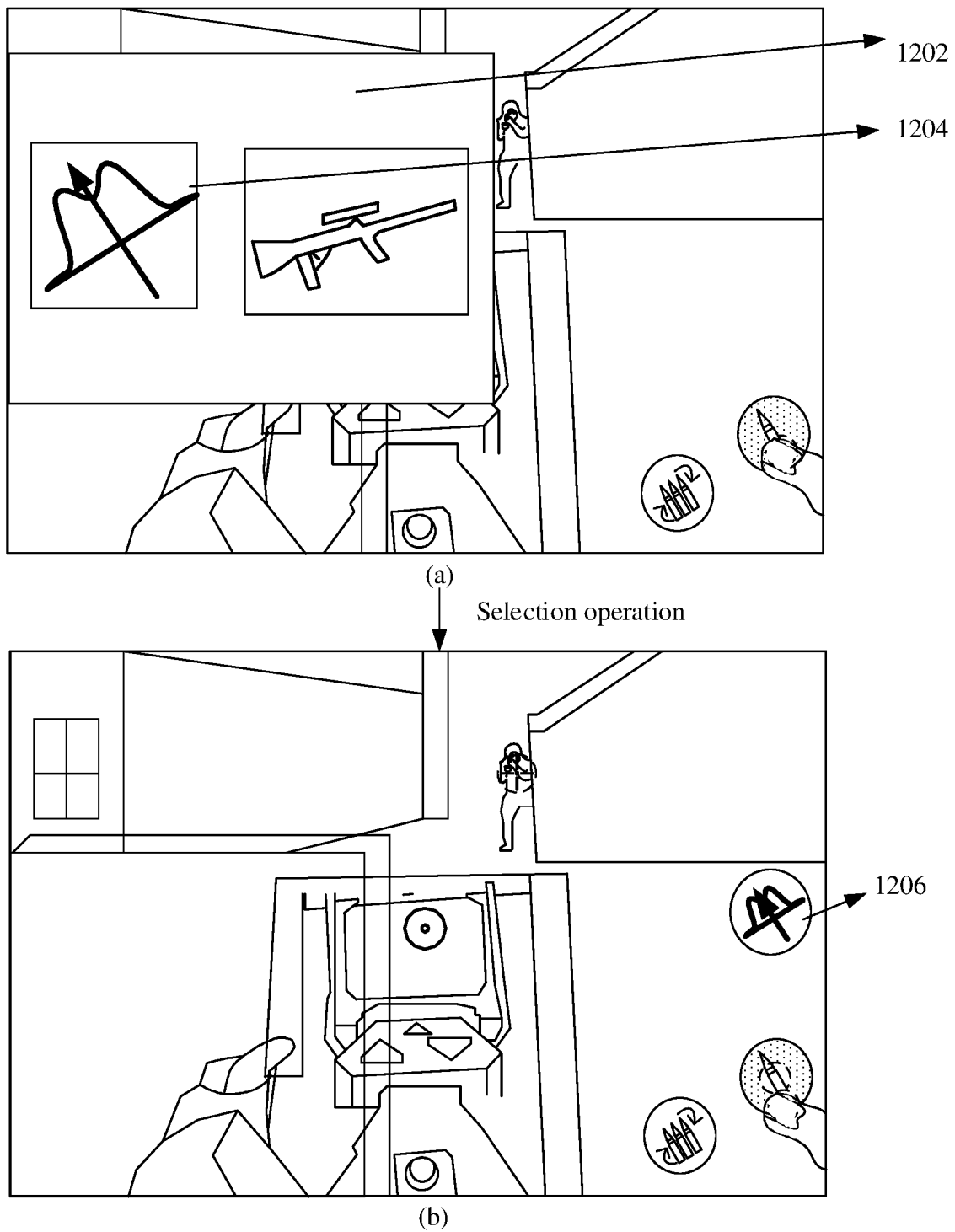
FIG. 12 is a schematic diagram of prop configuration according to an embodiment of this application.

For example, with reference to FIG. 12, it is assumed that when a prop configuration instruction triggered in a shooting task is acquired, a configuration interface 1202 shown in (a) in FIG. 12 is displayed in response to the prop configuration instruction, and various shooting props such as a crossbow or a gun are displayed. Further, it is assumed that a selection operation performed on a target slot 1204 is acquired, a shooting prop (for example, a strong crossbow) in the selected target slot 1204 is added to the shooting task, and a prop trigger icon of the shooting prop is displayed in an operation area (for example, an operation area in a virtual battlefield scene provided by the shooting task) of the shooting task, such as an icon 1206 shown in (b) in FIG. 12.

According to the embodiment provided in this application, before the shooting task is run, the target shooting prop is selected and configured from the target operation (the selection operation for the target slot) that is separately configured for the target shooting prop, so that the target shooting prop can be quickly invoked and controlled, by using the operation area, to perform a plurality of continuous shooting actions in the shooting task, thereby saving time of invoking and loading the target shooting prop, and improving control efficiency of directly using the target shooting prop to perform a plurality of continuous shooting actions in the shooting task.

In some embodiments, in a target time period, after the performing, by using the target shooting prop, a plurality of continuous shooting actions on a target area in which the target object is located, the method further includes:

S1. Adjust the prop trigger icon corresponding to the target shooting prop in the operation area from a first display state to a second display state, the first display state being used for indicating that the target shooting prop is in the activated state; and the second display state being used for indicating that the target shooting prop is in a frozen state;

S2. Display remaining duration of the prop trigger icon corresponding to the target shooting prop in the second display state; and S3. Adjust, when the remaining duration is zero, the prop trigger icon corresponding to the target shooting prop from the second display state to the first display state.

After a shooting task is entered, an initial state of the target shooting prop is a frozen state and is not activated, and after the cold time ends, the target shooting prop is adjusted to be released from the frozen state to enter the activated state, so that the target shooting prop is allowed to be triggered to be invoked and perform a shooting action. In addition, after the target shooting prop completes a group of shooting actions (a quantity of shooting actions in a group of shooting actions may be set according to an actual application scene), the target shooting prop also enters the frozen state again, and the target shooting prop cannot enter the activated state again until the cold time ends. When the foregoing state changes, the prop trigger icon of the target shooting prop also adjusts the display state correspondingly, so as to intuitively prompt the player of the current state of the target shooting prop.

In some embodiments, when the target shooting prop is in the frozen state, remaining duration of the cold time is further correspondingly displayed, for example, displayed in a form of number countdown or progress bar.

Figure 13:
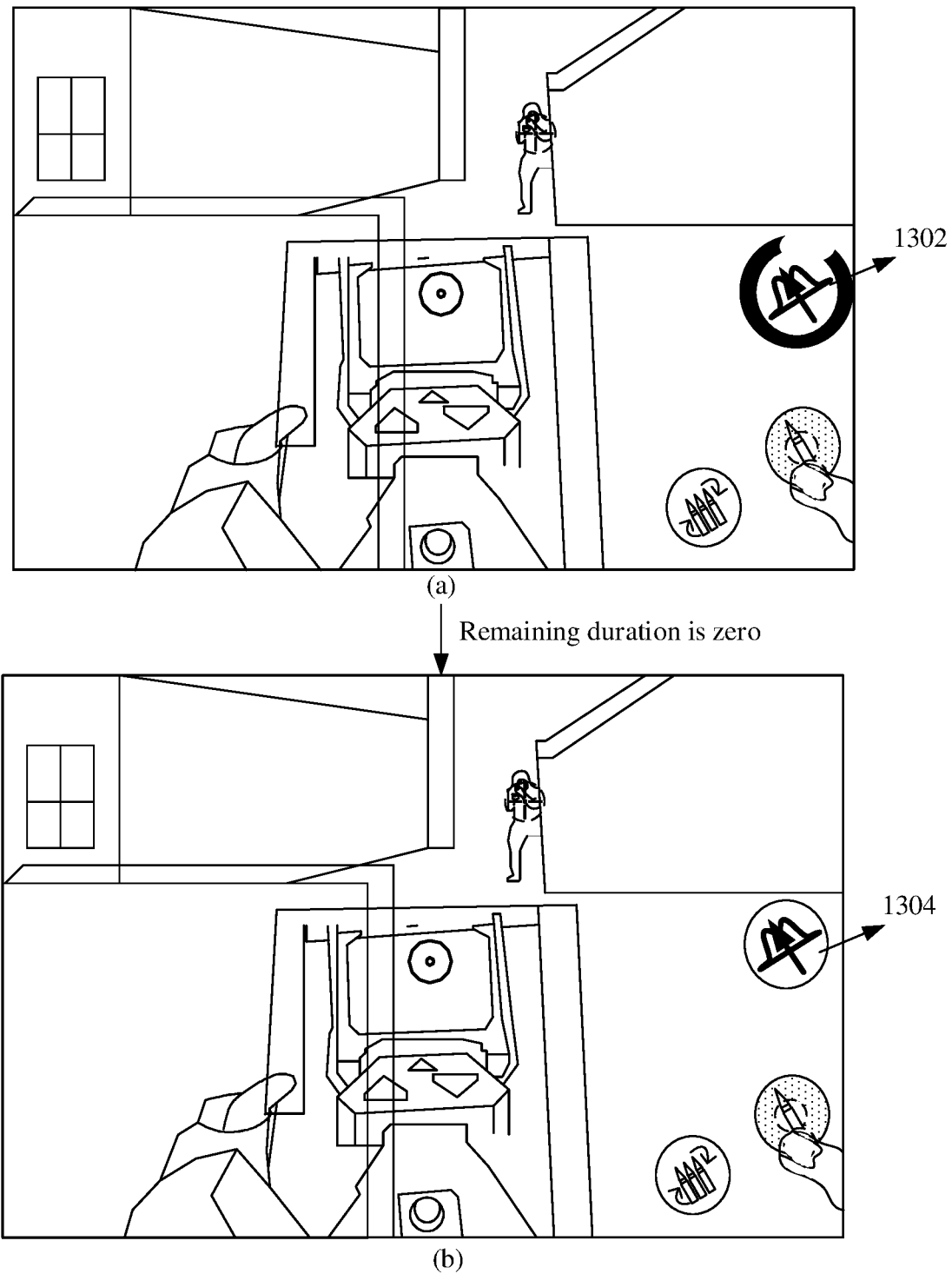
FIG. 13 is a schematic diagram of adjusting a display status of a prop trigger icon according to an embodiment of this application.

For example, with reference to FIG. 13, after completing a group of a plurality of continuous shooting actions, the target shooting prop adjusts the display state of the prop trigger icon from a first display state to a second display state, that is, the first display state is used for indicating that the target shooting prop is in an activated state, and the second display state is used for indicating that the target shooting prop is in the frozen state. In the frozen state, the target shooting prop does not respond after receiving a trigger operation.

Further, when the target shooting prop is in the frozen state, the prop trigger icon of the target shooting prop simultaneously displays remaining duration of the target shooting prop in the state by using a progress bar 1302, as shown in (a) in FIG. 13. When the remaining duration is zero, it indicates that the target shooting prop is switched from the frozen state to the activated state, and the prop trigger icon of the target shooting prop is also adjusted from the second display state to the first display state, as shown in an icon 1304 in (b) in FIG. 13.

According to the embodiment provided in this application, the display state of the prop trigger icon of the target shooting prop is used for indicating the state of the target shooting prop, so that in a process of a strained shooting task, a user can be intuitively prompted whether the user can invoke the target shooting prop to perform a shooting action, so as to simplify a control operation.

For ease of description, the foregoing method embodiments are stated as a combination of a series of actions. However, a person skilled in the art is to know that this application is not limited to the described action sequence, because according to this application, some steps may be performed in another sequence or simultaneously. Secondarily, a person skilled in the art knows that the embodiments described in the specification all belong to example embodiments and the involved actions and modules are not necessary for the present application.

Figure 14:
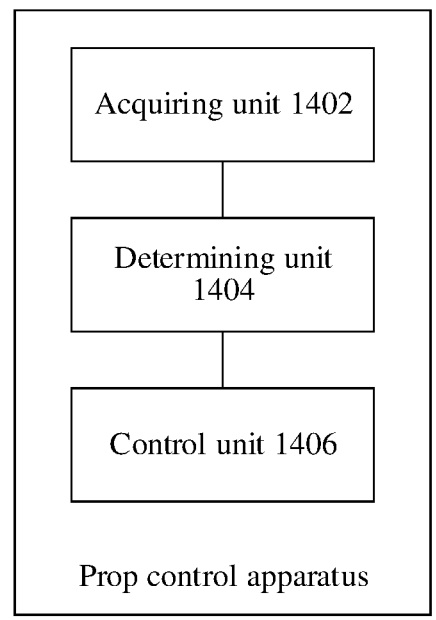
FIG. 14 is a schematic structural diagram of a prop control apparatus according to an embodiment of this application.

An embodiment of this application further provides a prop control apparatus used for implementing the foregoing prop control method. As shown in FIG. 14, the apparatus includes an acquiring unit 1402, configured to acquire a trigger operation performed on a target shooting prop in an activated state in a virtual battlefield scene, an attack range of the target shooting prop covering a partial area in the virtual battlefield scene; a determining unit 1404, configured to determine, in response to the trigger operation, a target object targeted by the target shooting prop; and a control unit 1406, configured to perform, in a target time period by using the target shooting prop, a plurality of continuous shooting actions on a target area in which the target object is located.

In this embodiment, for the foregoing embodiment of the prop control apparatus, reference may be made to the foregoing embodiment of the prop control method.

Figure 15:
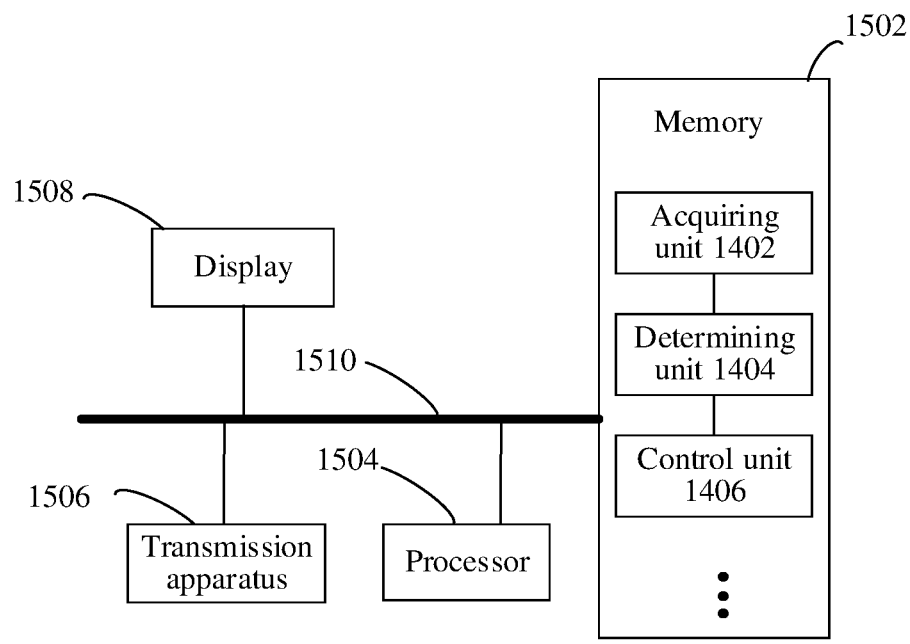
FIG. 15 is a schematic structural diagram of an electronic device according to an embodiment of this application.

An embodiment of this application further provides an electronic device used for implementing the foregoing prop control method. The electronic device may be the terminal device or the server shown in FIG. 1. In this embodiment, that the electronic device is a terminal device is used as an example for description. As shown in FIG. 15, the electronic device includes a memory 1502 and a processor 1504. The memory 1502 stores a computer program. The processor 1504 is configured to perform, by using the computer program, the prop control method provided in the embodiment of this application.

In some embodiments, the electronic device may be located in at least one of a plurality of network devices in a computer network.

In some embodiments, the processor may be configured to perform the following steps by using the computer program: acquiring a trigger operation performed on a target shooting prop in an activated state in a virtual battlefield scene, an attack range of the target shooting prop covering a partial area in the virtual battlefield scene; determining, in response to the trigger operation, a target object targeted by the target shooting prop; and performing, in a target time period by using the target shooting prop, a plurality of continuous shooting actions on a target area in which the target object is located.

A person of ordinary skill in the art may understand that, the structure shown in FIG. 15 is only schematic. The electronic device may be a terminal device such as a smartphone (such as an Android mobile phone or an iOS mobile phone), a tablet computer, a palmtop computer, a MID, or a PAD. FIG. 15 does not impose a limitation on a structure of the foregoing electronic device. For example, the electronic device may further include more or fewer components (such as a network interface) than those shown in FIG. 15, or have a configuration different from that shown in FIG. 15.

The memory 1502 may be configured to store a software program and a module, for example, a program instruction/module corresponding to the prop control method and apparatus in the embodiments of this application. The processor 1504 executes various functional applications and data processing by running the software program and the module that are stored in the memory 1502, that is, implements the prop control method. The memory 1502 may include a high-speed random access memory, and may also include a non-volatile memory, for example, one or more magnetic storage apparatuses, a flash memory, or another non-volatile solid-state memory. In some embodiments, the memory 1502 may further include memories remotely disposed relative to the processor 1504, and these remote memories may be connected to the terminal through a network. The foregoing examples of the network include, but are not limited to, the Internet, an intranet, a local area network, a mobile communication network, and a combination thereof. The memory 1502 may be but is not limited to storing information such as object attribute information of a virtual object and a picture resource (battle resource) corresponding to a shooting action. As an example, as shown in FIG. 15, the memory 1502 may be but is not limited to including the acquiring unit 1402, the determining unit 1404, and the control unit 1406 in the foregoing prop control apparatus. In addition, the memory 1502 may be but is not limited to including another module unit in the prop control apparatus.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In some embodiments, the electronic device includes a transmission apparatus 1506, and the transmission apparatus 1506 is configured to receive or send data through a network. Examples of the network may include a wired network and a wireless network. In some embodiments, the transmission apparatus 1506 includes an NIC. The NIC may be connected to another network device and a router by using a network cable, so as to communicate with the Internet or a local area network. In some embodiments, the transmission apparatus 1506 is a radio frequency (RF) module, which communicates with the Internet in a wireless manner.

In addition, the electronic device further includes a display 1508, configured to display the virtual battlefield scene, the virtual object in the virtual battlefield scene, and the generated shooting process picture; and a connection bus 1510, configured to connect various module components in the electronic device.

In another embodiment, the terminal device or server may be a node in a distributed system. The distributed system may be a blockchain system. The blockchain system may be a distributed system formed by the plurality of nodes connected in the form of network communication. The nodes may form a peer to peer (P2P) network. Computing devices in any form, for example, electronic devices such as a server and a terminal, can join the P2P network to become a node in the blockchain system.

An embodiment of this application provides a computer program product or a computer program. The computer program product or the computer program includes computer instructions, and the computer instructions are stored in a computer-readable storage medium. A processor of a computer device reads the computer instruction from the computer readable storage medium, and the processor executes the computer instruction, so that the computer device performs the foregoing prop control method.

In some embodiments, the foregoing computer readable storage medium may be set to store a computer program configured to perform the following steps: acquiring a trigger operation performed on a target shooting prop in an activated state in a virtual battlefield scene, an attack range of the target shooting prop covering a partial area in the virtual battlefield scene; determining, in response to the trigger operation, a target object targeted by the target shooting prop; and performing, in a target time period by using the target shooting prop, a plurality of continuous shooting actions on a target area in which the target object is located.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments of this application are merely for description purposes, and are not intended to indicate the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of this application.

In the foregoing embodiments of this application, descriptions of the embodiments have different emphases. As for parts that are not described in detail in one embodiment, reference may be made to the relevant descriptions of the other embodiments.

In the embodiments provided in this application, it is to be understood that the disclosed client may be implemented in another manner. The foregoing described apparatus embodiments are merely examples. For example, the unit division is merely logical function division and there may be other division manners in other implementations. For example, multiple units or components may be combined or integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A prop control method comprising:
   acquiring a trigger operation performed on a target shooting prop in a virtual battlefield scene, wherein an attack range of the target shooting prop covers a partial area in the virtual battlefield scene;
   acquiring operation attribute information of the trigger operation in response to the trigger operation;
   adjusting an aim point of the target shooting prop in an aiming direction to a target size that matches the operation attribute information;
   determining an object targeted by the aim point as a target object; and
   performing, in response to the trigger operation and in a target time period by using the target shooting prop, a plurality of continuous shooting actions on a target area in which the target object is located, wherein the target object is targeted by the target shooting prop.

2. The method according to claim 1, wherein the adjusting an aim point further comprises:
   acquiring a shooting parameter that matches the operation attribute information, the shooting parameter comprising a shooting initial speed and an initial gravity acceleration of a prop object that are shot by the target shooting prop; and determining a shooting flight track of the prop object in the aiming direction according to the shooting parameter, a flight distance of the shooting flight track being negatively related to the target size of the aim point when there is no collision.

3. The method according to claim 2, wherein the acquiring a shooting parameter that matches the operation attribute information comprises:
acquiring, when the operation attribute information is an operation duration, the shooting parameter that matches the operation duration, wherein the operation duration is positively related to the shooting initial speed and negatively related to the initial gravity acceleration; and the operation duration comprises any one of a press duration of a press operation, a gesture holding duration of a gesture operation, or a holding duration of a gesture trigger operation; or
acquiring, when the operation attribute information is the press operation, the shooting parameter that matches a pressing pressure, the pressing pressure being positively related to the shooting initial speed and negatively related to the initial gravity acceleration; or
acquiring, when the operation attribute information is a slide distance of a slide operation, the shooting parameter that matches the slide distance, the slide distance obtained by performing a slide operation in a first slide direction being positively related to the shooting initial speed and negatively related to the initial gravity acceleration, or the slide distance obtained by performing a slide operation in a second slide direction being negatively related to the shooting initial speed and positively related to the initial gravity acceleration; or
acquiring, when the operation attribute information is a gesture movement distance of a gesture operation, the shooting parameter that matches the gesture movement distance, the gesture movement distance obtained by performing a gesture operation in a first gesture direction being positively related to the shooting initial speed and negatively related to the initial gravity acceleration, or the gesture movement distance obtained by performing a gesture operation in a second gesture direction being negatively related to the shooting initial speed and positively related to the initial gravity acceleration.

4. The method according to claim 1, wherein the adjusting comprises:
adjusting, when the operation attribute information is an operation duration, the aim point of the target shooting prop in the aiming direction to a target size that matches the operation duration, the aim point being negatively related to the target size and the operation duration comprising any one of a press duration of a press operation, a gesture holding duration of a gesture operation, or a holding duration of a gesture trigger operation; or
adjusting, when the operation attribute information is a slide distance of a slide operation, the aim point of the target shooting prop in the aiming direction to a target size that matches the slide distance obtained by performing a slide operation in a first slide direction being positively related to the target size, or matches the slide distance obtained by performing a slide operation in a second slide direction being negatively related to the target size; or
adjusting, when the operation attribute information is a gesture movement distance of a gesture operation, the aim point of the target shooting prop in the aiming direction to a target size that matches the gesture movement distance, the gesture movement distance being obtained by performing a gesture operation in a first gesture direction that is positively related to the target size, or the gesture movement distance being obtained by performing a gesture operation in a second gesture direction that is negatively related to the target size.

5. The method according to claim 1, wherein after the performing, the method further comprises:
adjusting, when the target object is located in the attack range of the target shooting prop and a prop object shot by the target shooting prop collides with the target object, hit points of all objects in the target area in which the target object is located,
wherein the adjusted hit points are less than the hit points as unadjusted, and the target area is an area obtained by using a position of the target object as a center and a target distance as a radius.

6. The method according to claim 5, wherein the adjusting the hit points of all objects in the target area further comprises:
determining a distance between each of the objects and the center of the target area; and
adjusting the hit point of each of the objects according to the distance, wherein the distance and a change amplitude of the hit point are negatively related.

7. The method according to claim 1, wherein after the performing, the method further comprises:
adjusting, when the target object is not in the attack range of the target shooting prop and a prop object shot by the target shooting prop collides with a first reference object in the attack range of the target shooting prop, hit points of all objects in a first reference area in which the first reference object is located, wherein
the adjusted hit points are less than the hit points as unadjusted, a direction of the first reference object relative to the target shooting prop is the same as a direction of the target object relative to the target shooting prop, and the first reference area is an area obtained by using a position of the first reference object as a center and a first reference distance as a radius; or
adjusting, when the target object is not located in the attack range of the target shooting prop and the prop object shot by the target shooting prop does not collide with any object in the attack range of the target shooting prop, hit points of all objects in a second reference area, wherein
the adjusted hit points are less than the hit points as unadjusted, and the second reference area is an area obtained by using a landing position of a prop object as a center and a second reference distance as a radius.

8. The method according to claim 1, wherein the performing comprises:
performing, by using the target shooting prop when detecting that the aiming direction of the target shooting prop does not change in the target time period, a plurality of continuous shooting actions on the target area in which the target object is located; or
updating, when detecting that the aiming direction of the target shooting prop changes within the target time period, a target object targeted before each shooting action is performed by the target shooting prop, and performing, by using the target shooting prop, the shooting action on an updated target area in which the updated target object is located.

9. The method according to claim 1, wherein the performing comprises:
- performing, when detecting that a position of the target shooting prop does not change within the target time period, a plurality of continuous shooting actions on the target area in which the target object is located; or
- updating, when detecting that the position of the target shooting prop changes within the target time period, a target object targeted before each shooting action is performed according to the position of the target shooting prop before each shooting action, and performing, by using the target shooting prop, the shooting action on an updated target area in which the updated target object is located.

10. The method according to claim 1, wherein the virtual battlefield scene runs in a shooting task; and before the acquiring a trigger operation performed on the target shooting prop in a virtual battlefield scene, the method further comprises:
- acquiring a prop configuration instruction;
- displaying, in response to the prop configuration instruction, a configuration interface that is in the shooting task and is used for providing a shooting prop, the configuration interface comprising a target slot configured for the target shooting prop;
- adding, when a selection operation performed on the target slot is acquired, the target shooting prop to the shooting task; and
- displaying a prop trigger icon corresponding to the target shooting prop in an operation area of the shooting task.

11. The method according to claim 10, wherein after the performing, the method further comprises:
- adjusting the prop trigger icon corresponding to the target shooting prop in the operation area from a first display state to a second display state, the second display state being used for indicating that the target shooting prop is in a frozen state;
- displaying a remaining duration of the prop trigger icon corresponding to the target shooting prop in the second display state; and
- adjusting, when the remaining duration is zero, the prop trigger icon corresponding to the target shooting prop from the second display state to the first display state.

12. The method according to claim 11, wherein the displaying the remaining duration of the prop trigger icon further comprises:
- displaying the remaining duration of the prop trigger icon corresponding to the target shooting prop in the second display state according to a countdown prompt manner, wherein the countdown prompt manner comprises at least one of a seconds countdown or a progress bar countdown.

13. A prop control apparatus, comprising a memory for storing computer instructions and at least one processor configured to execute the computer instructions to cause the prop control apparatus to:
- acquire a trigger operation performed on a target shooting prop in a virtual battlefield scene, wherein an attack range of the target shooting prop covers a partial area in the virtual battlefield scene;
- acquire operation attribute information of the trigger operation in response to the trigger operation;
- adjust an aim point of the target shooting prop in an aiming direction to a target size that matches the operation attribute information;
- determine an object targeted by the aim point as a target object; and
- perform, in response to the trigger operation and in a target time period by using the target shooting prop, a plurality of continuous shooting actions on a target area in which the target object is located, wherein the target object is targeted by the target shooting prop.

14. The prop control apparatus of claim 13, wherein the at least one processor is further configured to execute the computer instructions to cause the prop control apparatus to:
- acquire a shooting parameter that matches the operation attribute information, the shooting parameter comprising a shooting initial speed and an initial gravity acceleration of a prop object that are shot by the target shooting prop; and
- determine a shooting flight track of the prop object in the aiming direction according to the shooting parameter, a flight distance of the shooting flight track being negatively related to the target size of the aim point when there is no collision.

15. The prop control apparatus of claim 13, wherein the at least one processor is further configured to execute the computer instructions to cause the prop control apparatus to:
- adjust, when the target object is located in the attack range of the target shooting prop and a prop object shot by the target shooting prop collides with the target object, hit points of all objects in the target area in which the target object is located, wherein the adjusted hit points are less than the hit points as unadjusted, and the target area is an area obtained by using a position of the target object as a center and a target distance as a radius.

16. A non-transitory computer readable storage medium, comprising a stored computer program, and the computer program running to perform:
- acquiring a trigger operation performed on a target shooting prop in a virtual battlefield scene, wherein an attack range of the target shooting prop covers a partial area in the virtual battlefield scene;
- acquiring operation attribute information of the trigger operation in response to the trigger operation;
- adjusting an aim point of the target shooting prop in an aiming direction to a target size that matches the operation attribute information;
- determining an object targeted by the aim point as a target object; and
- performing, in response to the trigger operation and in a target time period by using the target shooting prop, a plurality of continuous shooting actions on a target area in which the target object is located, wherein the target object is targeted by the target shooting prop.

17. The non-transitory computer readable storage medium of claim 16, wherein the virtual battlefield scene runs in a shooting task; and before the acquiring a trigger operation performed on the target shooting prop in a virtual battlefield scene, the computer program running further performs:
- acquiring a prop configuration instruction;
- displaying, in response to the prop configuration instruction, a configuration interface that is in the shooting task and that is used for providing a shooting prop, the configuration interface comprising a target slot configured for the target shooting prop;
- adding, when a selection operation performed on the target slot is acquired, the target shooting prop to the shooting task; and
- displaying a prop trigger icon corresponding to the target shooting prop in an operation area of the shooting task.

18. The non-transitory computer readable storage medium of claim 16, wherein after the performing, the computer program running further performs:

adjusting a prop trigger icon corresponding to the target shooting prop in an operation area from a first display state to a second display state, the second display state being used for indicating that the target shooting prop is in a frozen state;

displaying a remaining duration of the prop trigger icon corresponding to the target shooting prop in the second display state; and adjusting, when the remaining duration is zero, the prop trigger icon corresponding to the target shooting prop from the second display state to the first display state.

* * * * *